United States Patent [19]

Smith

[11] 4,019,682
[45] Apr. 26, 1977

[54] ORCHARD SPRAYING MACHINES

[75] Inventor: Anthony Pawson Smith, Stockbury, England

[73] Assignee: Drake & Fletcher Limited, England

[22] Filed: May 14, 1975

[21] Appl. No.: 577,454

[30] Foreign Application Priority Data

May 16, 1974 United Kingdom ............ 21789/74

[52] U.S. Cl. .................................................. 239/77
[51] Int. Cl.² ........................................ A01N 17/08
[58] Field of Search ........................... 239/77, 78

[56] References Cited

UNITED STATES PATENTS

| | | | |
|---|---|---|---|
| 2,538,879 | 1/1951 | Newcomb et al. | 239/78 |
| 2,587,240 | 2/1952 | Spreng | 239/77 |
| 2,618,508 | 11/1952 | Daugherty | 239/77 |
| 2,620,230 | 12/1952 | Hait | 239/78 |
| 2,686,990 | 8/1954 | Matthews | 239/77 X |
| 2,925,222 | 2/1960 | Spreng | 239/77 X |
| 3,097,794 | 7/1963 | Dawson | 239/78 |
| 3,227,376 | 1/1966 | Rittenhouse | 239/78 |
| 3,385,521 | 5/1968 | Ballu | 239/77 |

FOREIGN PATENTS OR APPLICATIONS 154,048   4/1956   Sweden ............................ 239/78

Primary Examiner—John J. Love
Attorney, Agent, or Firm—Oblon, Fisher, Spivak, McClelland & Maier

[57] ABSTRACT

The invention relates to orchard spraying machines in which a vehicular frame carries a chamber housing a fan disposed with its axis horizontal to draw air into the chamber. The fan forces air through peripheral outlets in the chamber in a direction substantially radially of the fan axis to entrain, as a spray, insecticidal or other material discharged into the ejected air stream. In the improvements provided by the invention, the fan is located at the front of the chamber to blow air through an open front end thereof and, additionally or alternatively, the chamber is divided downstream of the fan into a plurality of axially extending air passages spaced angularly about the fan axis.

11 Claims, 7 Drawing Figures

ORCHARD SPRAYING MACHINES

This invention relates to spraying for horticulture and like purposes, and provides an improved spraying machine of the kind comprising a vehicular frame having mounted thereon a chamber housing a fan disposed with its axis horizontal to draw air into the chamber and to force it through peripheral outlets in the casing in a direction substantially radially of the fan axis and means discharging material to be sprayed into the ejected air stream whereby said material is estrained in said air stream. Spraying machines of said kind are known as "orchard spraying machines" and will be referred to such hereinafter.

In known orchard spraying machines, the fan is located at the rear of the frame (relative to the direction of travel thereof during spraying) to draw air into a rearwardly facing open end of the chamber. Such an arrangement has the disadvantage of permitting the fan to suck in dust, leaves and spray made airborne by the forward movement of the machine and, when it is not self-propelled (as usual), the towing vehicle. In particular, the force of the spray generated by the machine dislodges leaves from trees being sprayed and these leaves are drawn towards the fan. It is usual practice to provide a mesh guard over the rear end of the chamber to prevent ingress of the leaves but the leaves cling to the guard and reduce the air intake into the chamber. Further, in said known machines air is allowed to circulate substantially freely in the chamber and, in particular, to swirl about the fan axis. Accordingly, they are inefficient both in terms of power usage and spray control.

To the best of the Inventor's knowledge about half-a-million orchard spraying machines have been manufactured over a period of about 35 years by more than 50 different companies and every one of them has suffered from at least one of the aforementioned disadvantages. He has now devised simple yet effective improvements to orchard spraying machines which overcome, or at least reduce substantially, those disadvantages.

According to a first embodiment of the present invention, there is provided an orchard spraying machine in which the chamber has a forwardly facing open end and the fan is mounted in said end.

According to a second embodiment of the present invention, there is provided an orchard spraying machine in which the chamber is divided downstream of the fan into a plurality of axially extending air passages spaced angularly about the fan axis, each passage communicating with one or more respective peripheral air outlets.

In a preferred embodiment an orchard spraying machine of the invention incorporates the features of both of said first and second embodiments.

Conveniently the vehicular frame is a trailer adapted to be towed by (and to receive power from) an agricultural tractor, and the open, intake, end of the chamber is in this case directed to the forward, tow-bar, end of the trailer.

The vehicular frame of the first embodiment can carry a spraying material tank rearwardly of the chamber and this tank may have an agitator which can be driven mechanically from the fan. For example, the agitator can be driven from the rear end of a shaft driven by the fan and extending through the tank in a fluid-tight manner.

The air passages of the second embodiment suitably are defined by a plurality of angularly spaced vanes extending radially of the fan axis. Preferably, the air passages have respective curve surfaces to smoothly direct air towards the air outlets. It is also preferred that guide plates are provided at the air outlets to control the direction of emission of the air flowing out from the various passages. These guide plates can direct all of the air leaving the air outlets sideways of the machine, suitably within an angularly spaced pair of arcs each between 30° below horizontal to 40° above horizontal. The means discharging spraying material into the air streams can comprise a spray boom having nozzles pointing in the direction of air flow and located between the outlet ends of guide plates when the latter are provided.

The invention will be clearly understood from the following description of one form (given, however, merely by way of example) which it may assume, and this description will be more readily followed by reference to the accompanying drawings wherein FIG. 1 represents in side elevation a trailer supporting a spraying device in accordance with the invention:

Figure 1:
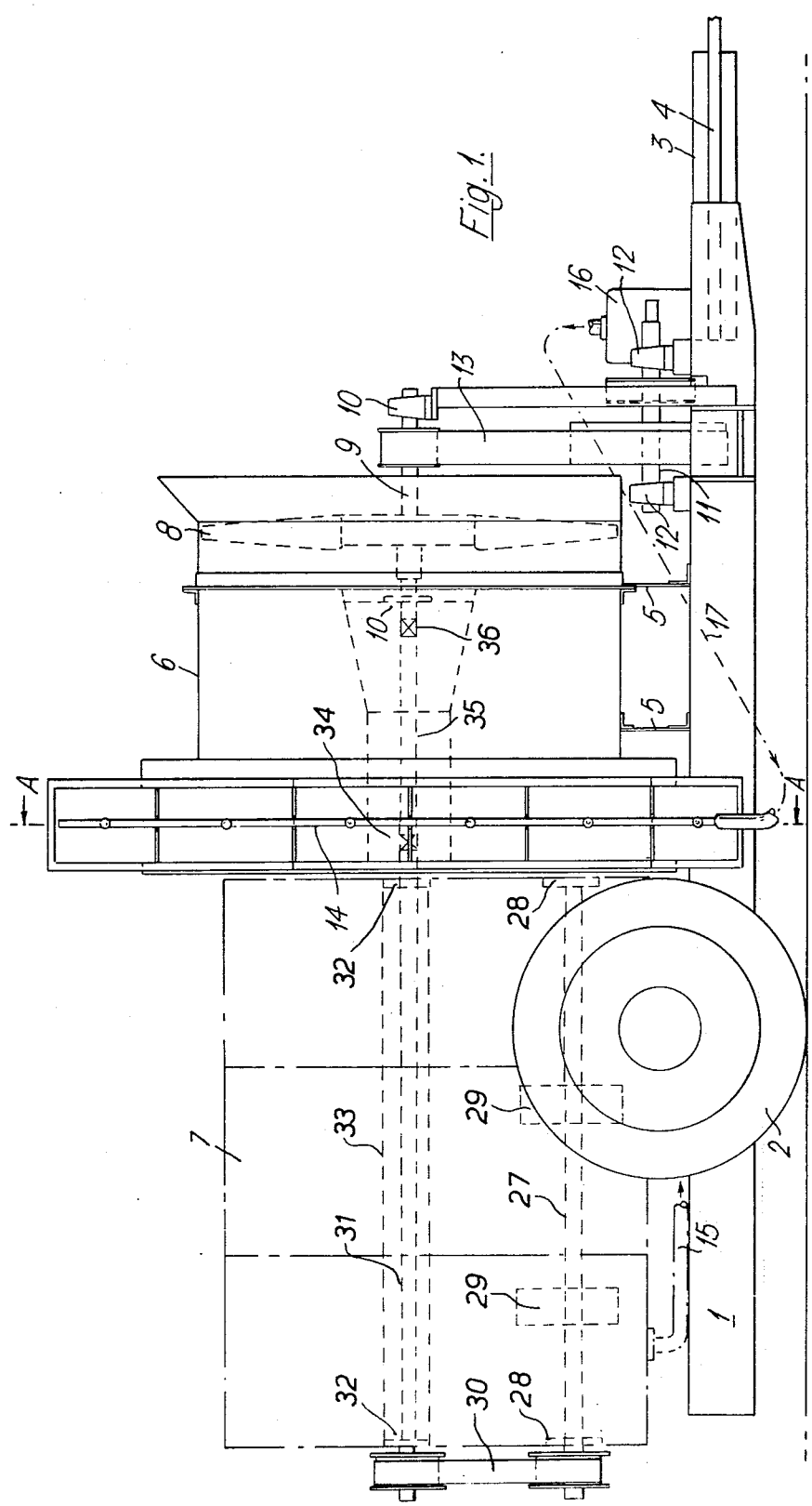

In carrying the invention into effect in one convenient manner, as shown in the aforesaid drawings, a horticultural or like spraying apparatus comprises a trailer frame 1 on wheels 2 with a towbar 3 for attachment to a tractor. A transmission shaft 4 is provided for attachment to the power take-off shaft of the tractor in order to drive components mounted on the trailer, as described below.

On the trailer frame 1 is mounted on brackets 5 a cylindrical air chamber 6, and a tank 7 for liquid insecticide. In the inlet mouth of the chamber 6 is mounted on axial flow fan 8 of which the shaft 9 extends between bearings 10. The transmission shaft 4 is connected by gearing, not shown, to a shaft 11 in bearings 12. A belt 13, or preferably a chain runs over the pulleys, or toothed wheels, respectively on the shafts 9 and 11 to drive the fan 8 from the power take-off shaft of a tractor to which the shaft 4 is connected. The rear end of the chamber 6 is closed, but has peripheral outlets for substantially radial escape of air directed into and through the chamber 6 when the fan 8 is driven.

It is a feature of the invention that the open end of the chamber 6 constituting the air inlet opening is directed to the forward end of the trailer frame 1, i.e. forwardly in the direction of movement of the trailer when towed. This inlet mouth of the chamber 6 may be fitted with a wire or like grid (not shown) to prevent inadvertent access when the fan is running.

The air escaping from the peripheral outlets at the rear of the chamber 6 constitutes an air stream to carry to trees, bushes and the like insecticidal spray entrained in the airstream when discharged from nozzles of a spray boom 14, to which the insecticide is fed from tank 7 by way of a pipe 15 to a pump 16, driven by the shaft 4 and/or shaft 11, and thence by way of a pipe 17 to the spray boom.

It is not desired to direct insecticide to the ground, or vertically into the air, and in order to avoid such waste it is a further feature of the invention to provide means for guiding and controlling the flow of air through, and from, the chamber 6 and its outlets. With this end in view partitions inside the casing 6 and/or guide means for the air in the peripheral outlet of the casing may be provided.

Figure 2:
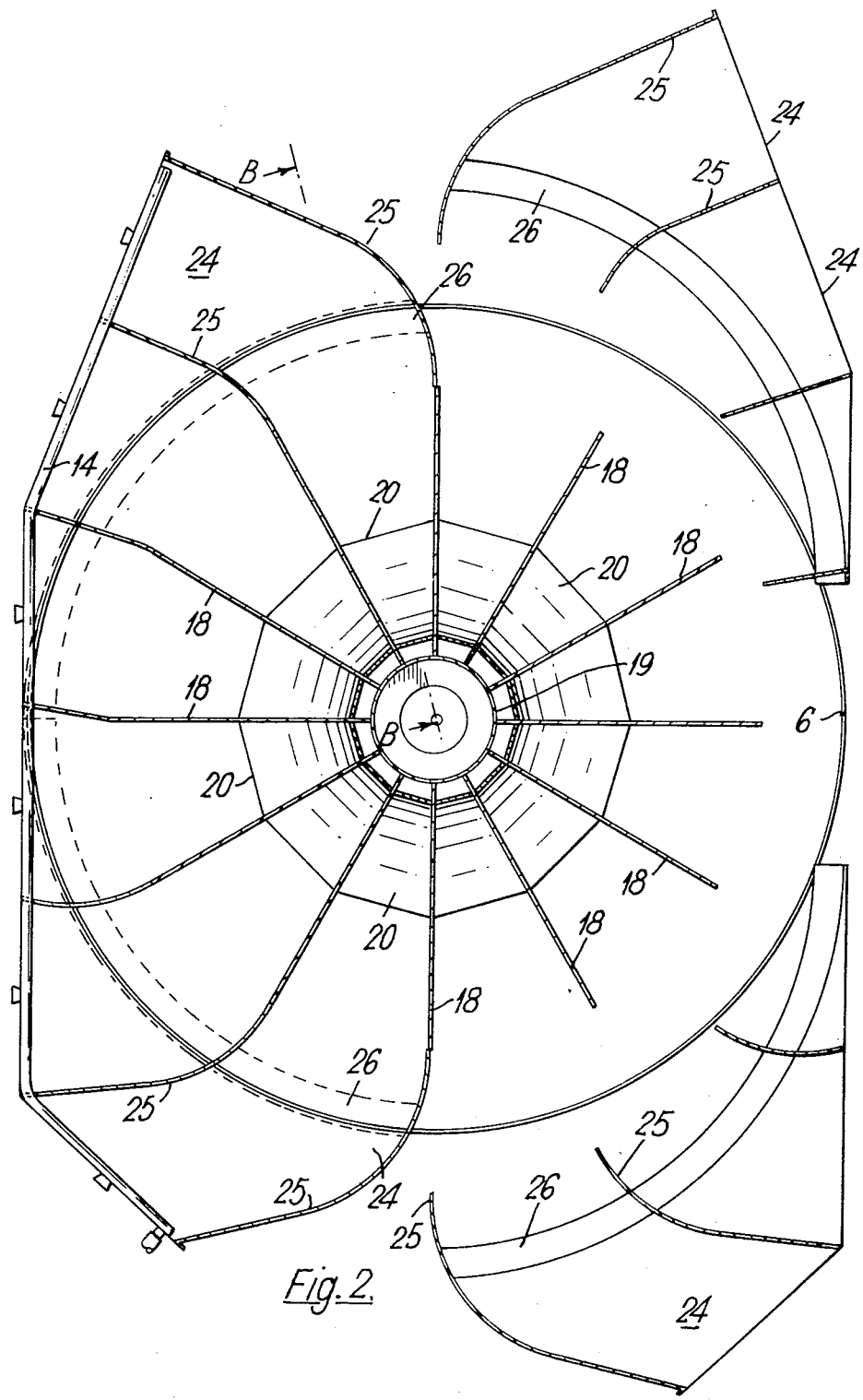
FIG. 2 represents a slightly enlarged cross-sectional view of the rear end of the air chamber in the plane A—A of FIG. 1.
Figure 3:
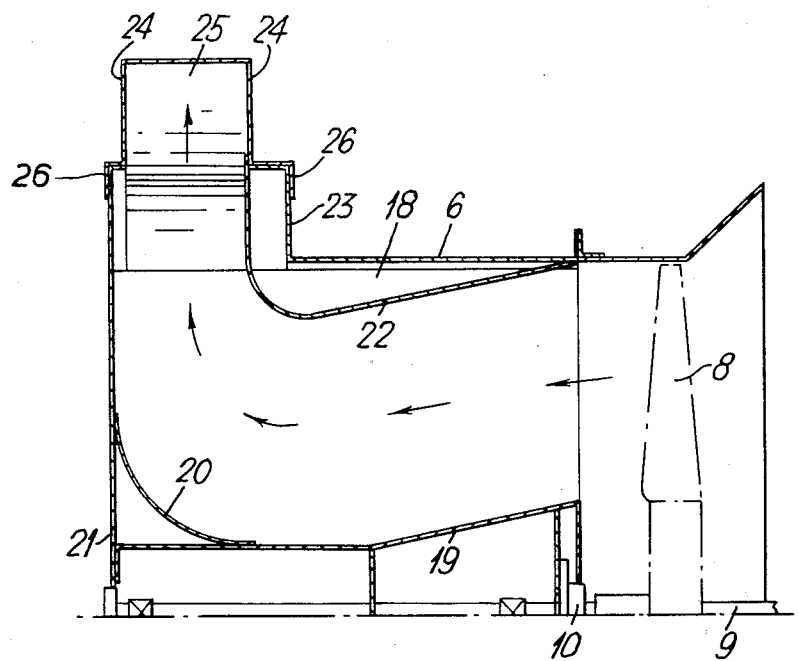
FIG. 3 represents a sectional view of the plane B—B of FIG. 2.

In one convenient arrangement, shown in FIGS. 2 and 3, the interior of the chamber is partitioned by a plurality of radial vanes 18 projecting from a central boss 19, and extending the full length of the chamber from a pivot just to the rear of the fan 8, to the closed rear end of the chamber 6. As shown in FIGS. 2 and 3 twelve such vanes may be provided in an equispaced angular array. These vanes cause the airstream to flow along twelve independent paths or channels, and prevent spiral flow. In order to guide these separate airflows to a direction of escape substantially radially of the chamber 6 at the rear outlet slot, there is fitted at the rear end of each channel a curved plate 20 to ensure a smooth curved wall guiding the air from substantially axial to substantially radial movement against the rear closure wall 21 of the chamber 6. The outer wall of each arcuate-sectioned channel between vanes 18 is also provided with a curved guide wall 22 substantially parallel to the face of the boss 19 and the curved guide 20.

The outlet slot of the chamber 6 is defined between a flange 23 and the end wall 21 of the chamber, and is fitted with guide plates which direct the escaping columns of air in pre-arranged desired directions. Such guide plates are incorporated in frames adapted to fit to the edges of the end wall 21 and flange 23, and as seen in FIG. 2 for such frames may be provided to encircle the outlet slot of the chamber (two of the frames being shown detached from the outlet slot).

Each frame comprises parallel side plates 24 with guide plates 25 extending between them, in spaced positions. The inner edges of the plates 24 are part-circular to conform with the inturned edges of the end wall 21 and flange 23 of the chamber outlet slot; and they have outwardly extending flanges 26 to fit over the flange 23 and plate 21(FIG. 3). The guide plates 25 project inwards beyond the flanges 26, so that when the frame is fitted to the chamber 6 of the inner edges of the guide plates mate with edges of the vanes 18, (FIGS. 2 and 3). The number of guide plates 25 correspond to the number of vanes 18, and the guide plates are curved to ensure that the air escaping from each channel between adjacent vanes 18 is ejected in a desired direction. In the guide members shown in FIG. 2 it will be seen that the flows from the uppermost channels are directed sideways, one to the right and the other to the left, at angles of about 30°–40° upwards to the horizontal, while the flows from the lowermost channels are directed at angles of about 20°–30° to the horizontal, and flows from intermediate channels directed at different angles intermediate between those of the uppermost and lowermost channels. The spray boom 14 is held by clips in semi-circular recesses in the outer edges of the guide plates 25.

When the guide plate frames are fitted to the outlet slot of the chamber 6 and the fan is set in motion the airstream is divided by the vanes 18, and guided by the walls 20, 22 and the guide plates 25, to follow a desired flow pattern, and to carry entrained spray from the boom 14 in the desired manner.

Figure 4:
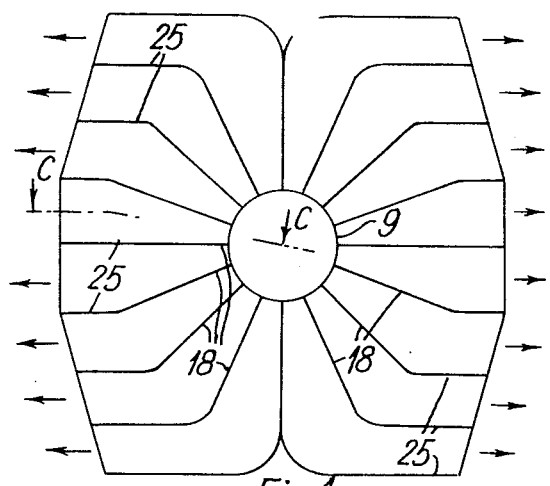
FIG. 4 represents a front view of an alternative arrangement of air-distributing means which may be employed in place of the arrangement shown in FIG. 2.
Figure 5:
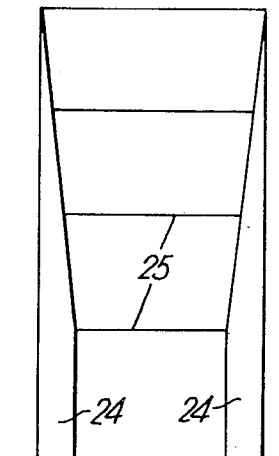
FIG. 5 represents an enlarged sectional view in the plane C—C of FIG. 4.
Figure 6:
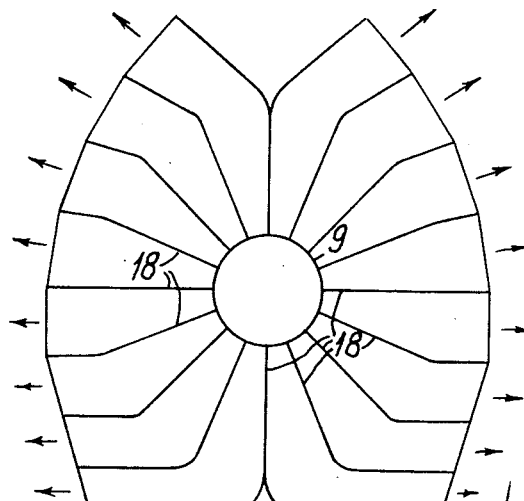
FIG. 6 represents yet another air-distributing device.
Figure 7:
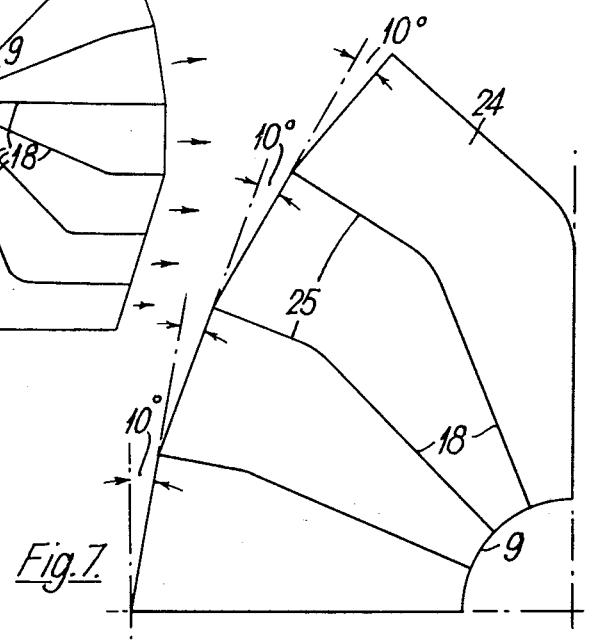
FIG. 7 represents an enlarged view of part of the device shown in FIG. 6, illustrating angular dispostion of the outlet mouths.

To secure different spray patterns alternative arrangements of vanes 18 and guide plates 25 may be provided. In FIGS. 4 and 5 is shown an arrangement of 16 vanes 18 with a corresponding number of guide plates 25 to provide a substantially parallel horizontal spraystream on each side of the machine. In FIGS. 6 and 7 another arrangement providing 16 channels, with the guide plates 25 curved to ensure horizontal emission on each side just above ground level, and increasing upwardly inclined flows from the outlets above. The mouths of the outlets from the guide plate frame may in this case be inclined to one another by an angle of about 10° as shown in FIG. 7.

The tank 7 has an agitator shaft 27 journaled for rotation in bearings 28 and carrying paddles shown diagrammatically at 29. Shaft 27 extends rearwardly of tank 7 where it is connected by a belt 30 running over respective pulleys to a drive shaft 31. This shaft 31 is journaled for rotation in bearings 32 and extends through a stationary sleeve 33. The forward end of the shaft 31 is connected at a universal joint 34 to a further drive shaft 35 which is in turn connected to shaft 9 by a universal joint 36. It will be seen therefore that fan 8, or more precisely the shaft on which it is mounted, provide the drive for the agitator in tank 7.

It wll be appreciated that the invention is not limited solely to the details of the forms described above but said details can be mofified or varied, in order to meet various conditions and requirements encountered, without departing from the scope of the invention.

What is claimed is:
1. An orchard spraying machine comprising:
   a vehicular frame;
   a chamber mounted on the frame having a forward-facing open end disposed at the front of said machine;
   an axial flow fan mounted in said open end of the chamber with its axis horizontal so as to draw air into the chamber through said open end;
   a plurality of peripheral air outlets in the chamber disposed substantially radially of the fan axis and spaced rearwardly of the fan;
   spray material supply means for discharging material to be sprayed into the air streams passing through said outlets; and
   means dividing the chamber downstream of the fan, said chamber having a diameter substantially corresponding to the diametrical extent of the fan blades, into a plurality of discrete, axially extending air passages spaced angularly about the fan axis, said air passages being respectively continuously fluidically connected to said peripheral air outlets for directing air from said fan, through said air chamber passages, and to said peripheral air outlets.

2. The orchard spraying machine of claim 1 wherein the vehicular frame is a trailer adapted to be towed by an agricultural tractor.

3. The orchard spraying machine of claim 1 wherein the vehicular frame carries a spraying material tank rearwardly of the chamber.

4. The orchard spraying machine of claim 3 wherein the tank has an agitator driven mechanically from the fan.

5. The orchard spraying machine of claim 4 wherein the agitator is driven from the rear end of a shaft driven by the fan and extending through the tank in a fluid-tight duct.

6. The orchard spraying machine of claim 1 wherein the means defining the air passages comprises:
a plurality of axially elongated, radially extending vanes spaced angularly about the fan axis.

7. The orchard spraying machine of claim 6 wherein said means defining said air passages further comprises curved surface means respectively connected to said vanes at their downstream ends and to said peripheral outlets so as to smoothly direct air to said peripheral air outlets from said axial passages.

8. The orchard spraying machine of claim 1 wherein guide plates are provided to control the direction of air flowing through the air outlets.

9. The orchard spraying machine of claim 8 wherein the guide plates are arranged to direct all of the air leaving the air outlets sideways of the machine.

10. The orchard spraying machine of claim 9 wherein the guide plates are arranged to direct air leaving the machine within an angularly spaced pair of arcs each between about 30° below horizontal and about 40° above horizontal.

11. The orchard spraying machine of claim 9 wherein the spray material supply means includes a spray boom having nozzles pointing in the direction of air flow and located between the outlet ends of the guide plates.

* * * * *